United States Patent Office 3,264,131
Patented August 2, 1966

3,264,131
PROCESS FOR FUSION COATING AND
MATERIALS USED THEREIN
Fritz J. Nagel, Reiffton, Reading, Pa., assignor, by mesne assignments, to The Polymer Corporation, a corporation of Pennsylvania
No Drawing. Continuation of application Ser. No. 28,208, May 11, 1960. This application May 11, 1964, Ser. No. 366,587
5 Claims. (Cl. 117—21)

This invention relates to improved methods for applying materials to substrates in fusion coating processes, and is a continuation of co-pending application Serial No. 28,208, filed May 11, 1960, and now abandoned. More particularly, this invention relates to means for obtaining greater adhesion between a substrate and a fused coating of a synthetic resinous material.

A new fusion coating process has been gaining wide acceptance in which a heat fusible pulverulent coating material is fluidized in a bed by passing a distributing stream of gas upwardly through a container in which the material is held. A heated article is immersed in the fluidized bed whereupon the pulverulent material adheres to the surface and melts thereon to coalesce and form a uniform continuous coating. The quality of this coating may often be improved by imparting a to-and-fro motion to the heated article while immersed in the fluidized bed. Although the present invention is concerned primarily with improved adhesion of the coating material to the article in the fluidized bed coating process, the pulverulent coating material may also be applied by other techniques. For example, the heated article may be immersed in a body of unsuspended powder or the powder may be suspended in a gas stream and sprayed on the surface of the article. As used in the present application, the term "fusion coating" or "fusion coating procedure" refers to processes, including the fluidized bed process, in which a synthetic resinous layer-forming material in pulverulent form is applied to the surface of a heated article and is melted thereon to from the desired coating. As these processes make use of layer-forming material in pulverulent form, they are readily distinguished from liquid coating processes such as those utilizing plastisols and organisols.

It is well known in the prior coating art that adhesion of coating materials to various articles may be materially improved through the use of an undercoat layer or layers of primer material. Also, primers are useful in preventing underfilm corrosion. For example, primers ae conventionally used in applying paint; they ae used in dip coating with plastisols and organisols; they are used in applying lacquers and other finishing materials; and many other finishing operations.

Serious difficulties have been encountered in attempting to adapt primers for use in fusion bond processes, and particularly the fluidized bed process, due to the very high temperatures to which the primers must be exposed. In the prior art processes, while it is sometimes necessary to utilize a limited amount of heat to effect a cure of certain primers, such as those that incorporate thermosetting resinous material, cure temperatures are adjusted to comparatively low ranges in which thermal degradation will not readily occur. It is also sometimes necessary in those processes to apply heat to the final coating layer to develop its ultimate properties. Baking of the applied finish is utilized, for example, in the application of certain enamels, varnishes and paints, and also in the solvation of plastisols or evaporation of solvents as well as solvation in the case of organisols. It is necessary, of course, that the primer material withstand the applied heat of the baking operation without degradation; however, this is seldom troublesome as in these final heat curing processes, the primer is protected by an outer layer of coating material; the baking temperatures are quite low, commonly in the temperature range of from about 250° F. to 300° F., and the evaporation of solvents retards rapid increases in temperature.

In distinct contrast to the above processes, fusion coating processes frequently require that primers be exposed to temperatures in substantial excess of the point at which they are subject to thermal degradation. It should be noted at the outset that as used herein, phrases such as "thermally stable," "resistant to thermal degradation" and the like, mean that the primer retains its desired characteristics despite the influence of process temperatures. It is not known, nor is it of consequence to this invention whether actual chemical degradation or other specific chemical changes occur in the primer material. It is important, however, that the primer retains the desired characteristics such as adhesion and corrosive resistance despite the high temperatures applied.

The need for higher operating temperatures is inherent in fusion coating processes. First, it is necessary to heat an article to be coated, after the primer layer has been applied, to some point near or above the fusion temperature of the coating material. As no solvents are generally added to any appreciable degree to the coating materials, the coating materials are in the form of pulverulent powders at room temperature and heat alone is relied upon to achieve proper flow-out or fusion of the coating material into a smooth continuous film. Also, to perfect such a uniform film, it is sometimes desirable to subject the coating, after application to a substrate, to a postheating operation. In both the preheating and postheating steps, it is not uncommon for the primer to become exposed to temperatures as high as 500° F. to 750° F. These temperatures are in considerable excess of the thermal stability of most known primers that could otherwise be used in these fusion coating processes.

Not only must primers be able to withstand abnormally high temperatures in fusion bond processes, but they must be capable of withstanding them for significant periods of time required to raise the substrate to the fusion point of the coating materials. Further, for practical operating reasons, it is often convenient to have a large number of preheated parts stored at the required temperature. Allowances must also be made for human error and the discontinuities of coating operations that will not allow the maintenance of a rigorous time schedule that requires each part or articles to be detained only a precise number of minutes in an oven. Thus, it is extremely desirable, even though only a few minutes are required to heat an article to the fusion temperature of the coating material to be applied, to allow sufficient leeway to enable detention of an article in an oven for a period of several hours without causing thermal degradation to the primer.

Accordingly, it is an object of this invention to provide primer materials that will withstand elevated temperatures required by fusion coating processes.

It is another object of this invention to provide primers that will withstand prolonged exposure to elevated temperatures without material thermal degradation.

Yet another object of this invention is to provide improved primers that will withstand elevated and protracted exposure to high temperatures and still retain their desired adhesive and coating properties.

Still another object of this invention is to provide means for achieving improved adhesion between a substrate and a resinous coating material.

Quite briefly, the objects of this invention are achieved by careful control of the dry film thickness of the primer material applied. Quite generally it has been found that the best heat resistance can be obtained if the primer layer is applied in thicknesses of from about 0.01 mil to about 0.2 mil. More particularly, the preferred coating thickness is from about 0.05 mil to about 0.15 mil. These coating thicknesses are in sharp contrast to normal primer coats as applied, for example, for use with plastisols where the primer is applied in a layer about 10 to 20 times these thicknesses.

This invention has proved to be of particular importance when vinyl-based resins are used as the coating materials. In this instance, a marked decrease in thermal stability of the primer occurs when the dry film thickness is much in excess of 0.2 mil. On the other hand, the lower limit of primer thickness, here given as 0.01 mil, is not critical as to thermal stability, but is a practical limitation with regard to other desired characteristics, such as underfilm corrosion resistance. Thus, while thinner layers may be applied if thermal degradation and adhesive qualities are all that are of importance, it may be necessary to establish a compromise between desired thermal and adhesive characteristics and those of corrosion resistance. Normally, when vinyl coating materials are used, both properties can be attained if the dry film thickness of the primer material is in a preferred range of from about 0.01 mil to about 0.2 mil.

To illustrate more particularly the scope of this invention, the following examples are illustrative of the improved thermal-resistive qualities of primers prepared in the practice of this invention though it must be understood that such examples are not limiting and the scope of this invention is defined in the appendant claims.

In the following examples, the resulting adhesion, unless otherwise indicated, was determined by cutting a ¼" wide strip on a primed and coated plate and then attempting to peel the coating from the substrate. The arbitrary and relative terms used to describe the results are as follows: Excellent—the coating cannot be completely removed from the substrate. The adhesive strength of the primer exceeds the cohesive strength of the coating material. Good—the coating can be removed only with difficulty. The adhesive strength of the primer and the cohesive strength of the coating material are roughly equivalent. Fair—the coating can be peeled away from the substrate with comparative ease. The adhesive strength of the primer is quite low as compared to the cohesive strength of the coating material. None—coating material can be lifted off. No adhesion at all.

The dry film thickness of the primers was varied, in the below examples, by means of varying the solids concentration of the primers by the addition of solvents. The more dilute solutions produced the thinner dry film thickness.

As the dry film thickness of the primer within the range of this invention is of such a low magnitude, it is extremely difficult to measure directly. Accordingly, the dry film thicknesses of primer as shown in the examples were obtained by calculation. In these calculations, the per cent solids by weight was multiplied by the ratio of the specific gravities of the solvent to the resin in order to obtain a per cent by volume solids. Uniformly, the ratio of the specific gravities of the solvents to the resins contained within the primer was assumed to be 2/3. The wet film thickness of the applied primer was then determined by means of a Pfund gauge according to ASTM method D1212-54. The wet film thickness of the primer so determined was then multiplied by the per cent by volume solids in order to obtain a calculated value for the dry film thickness of the primer.

EXAMPLE I

A primer for vinyl coatings comprising a solution of an acrylonitrile butadiene rubber phenolic resin blend (Compo Chemical Company's Primer No. XA2-131-1) reduced with a solvent mixture of xylene, toluene, propyl acetate, butyl acetate, ethanol and Celanese solvents 601 and 901-H, was evaluated for the relationship of film thickness and thermal stability. These tests were performed by dipping a test steel panel ⅛" x 3" x 6" in the above primer, which was adjusted for varying solids content. The primed panels were then dried and cured in convection ovens as indicated in Table I below. At the end of the heating cycle the primed panels were immersed in a fluidized bed of a polyvinyl chloride coating material which was fused out into a continuous and smooth 12 mil coating. After the coating had been cooled to room temperatures, the adhesion of the various samples so prepared was tested and the results are given in Table I below. In each instance, the wet film thickness of the primers as applied and determined by a Pfund gauge was 2 mil.

*Table I*

| Percent Solids | Dry film thickness (Primer) | Adhesion | | | |
|---|---|---|---|---|---|
| | | 500° F. 60 min. | 600° F. 15 min. | 600° F. 30 min. | 600° F. 45 min |
| 25 | 0.33 | Good | None | None | None. |
| 12.5 | 0.17 | Excel | Excel | Excel | Excel. |
| 8.3 | 0.11 | Excel | Excel | Excel | Good. |
| 6.2 | 0.08 | Excel | Excel | Excel | Fair. |
| 5.0 | 0.07 | Excel | Excel | Excel | Do. |

EXAMPLE II

The experiments of Example I were duplicated using a primer for vinyl coatings comprising a commercially available product, Stanley 69X-1406, as manufactured by the Stanley Chemical Company of East Berlin, Connecticut. The top coat comprised a polyvinyl chloride resin mixture and the wet film thickness of the primer was 2 mil. The results are indicated in Table II below.

*Table II*

| Percent Solids | Dry film thickness (Primer) | Adhesion | | | | |
|---|---|---|---|---|---|---|
| | | 500° F. 10 min. | 500° F. 20 min. | 500° F. 35 min. | 600° F. 60 min. | 600° F. 90 min. |
| 25 | 0.33 | Excel | Good | Fair | None | None |
| 12.5 | 0.17 | Excel | Excel | do | Fair | |
| 8.3 | 0.11 | Excel | Excel | Excel | Excel | Fair-good. |
| 6.2 | 0.08 | Excel | Excel | Excel | Good | |
| 5.0 | 0.07 | Excel | Excel | Excel | None | None. |

EXAMPLE III

A primer for vinyl coatings comprising a solution of an acrylic, epoxy, and an epoxy curing agent (dicyanamide) was reduced with a solvent mixture of xylene, toluene, propyl acetate, butyl acetate, ethanol and Celanese solvents 601 and 901-H. Panels were coated with this primer material as in Examples I and II with various solids concentrations as indicated in Table III. In each instance, the primer was applied by dipping, and the wet film thickness obtained, as measured by a Pfund gauge, was 2 mil.

Each of the primed panels was dried and cured in a convection oven at 550° F. for about 30 minutes. The hot primed panels were then immersed in a fluidized bed of a commercial vinyl coating material to obtain a 12 mil coating over the panels. The adhesion was as indicated in Table III.

Table III

| Percent solids by weight | Dry film thickness (mils) | Adhesion |
| --- | --- | --- |
| 4 | 0.05 | Good. |
| 5 | 0.07 | Excel. |
| 6.2 | 0.08 | Excel. |
| 8.3 | 0.11 | Excel. |
| 12.5 | 0.17 | Excel. |
| 15 | 0.20 | Good. |
| 20 | 0.27 | Fair. |
| 25 | 0.33 | Do. |

From the above results, it will be appreciated that with this acrylic-epoxy-dicyanamide primer, the best thermal stability is obtained when the solids concentration of the primer is between about 4% and 15% by weight and the dry film thickness is between 0.05 and 0.20 mil.

In the above examples, the primer was applied to relatively smooth-surfaced steel panels made from commercial grade cold rolled steel. It has been observed that if the surface is somewhat roughened, as by sand blasting, a slightly greater solids concentration or film thickness must be used to obtain the same degree of thermal stability and adhesion. For example, when a vinyl coating is applied to a sand blasted steel pipe by dipping, it is necessary to increase the solids concentration to about 8.3% by weight to obtain the same degree of thermal resistance and stability as obtained when 6.2% solids are used in priming a smooth steel plate. Thus, the solids concentration and film thickness may have to be varied somewhat to obtain the desired thermal resistance of the primer, depending on the surface characteristics of the substrate.

It should also be appreciated that while the primers were applied in the above examples by dip coating techniques, many other means are available. For example, primers can be applied by spray coating, flow coating, brush coating, roller coating and the like, and a different wet film thickness will be obtained depending on which method of application is used. If methods such as spray coating are utilized, a great variance in the wet film thickness of the primer may be obtained merely by spraying the substrate for a shorter or longer period of time. Also, if extremely thin films are desired, roller coating methods may be advantageous. In addition, the wet film thickness of the primer will be dependent upon the viscosity of the solution. All in all, however, the useful range of thickness of the wet film of primers for use in this invention will generally lie between 1 and 3 mils.

In the above description, primary emphasis has been placed upon the dry film thickness of the primer as being determinative of improved properties. However, as the reason for these improved properties is not understood, allowance should be made for the possibility that the improved properties of thermal degradation are not achieved solely by use of a thin film, but may also be a function of the solids concentration of the primer. In the examples cited, for example, the primer film thickness was controlled within each example by the dilution of the primer with solvent. At present, no evidence indicates that the concentration of the primer has any function other than the physical characteristics of controlling the primer thickness on the substrate, but other effects of the variation of solvent to solids ratio upon the properties of the primer coat may also prove significant. While allowing for this and other possibilities, present experimental data available would seem to substantiate the validity of the thinness of the coating as being the criterion of this invention.

I claim:
1. In a method for applying a strongly adherent coating layer of a pulverulent vinyl coating composition to a substrate in heat fusion coating processes conducted at temperatures generally in excess of about 450° F. comprising the steps of
    applying to the substrate a primer for vinyls comprised of heat reactive synthetic resins contained in a volatile liquid carrier, which primer is effective to bond said vinyl coating composition to said substrate;
    heating said substrate to above the fusion temperature of said vinyl coating composition; and
    contacting said heated and primed substrate with said vinyl coating composition and fusing said coating composition into a continuous layer over said substrate; the improvement comprising using as the primer one that has a solids concentration of less than 12.5% by weight and forming a primer layer therefrom over said substrate that has a dry film thickness of less than about 0.2 mil.
2. A method according to claim 1 in which the solids concentration of said primer is less than 10% by weight and the dry film thickness of the primer layer is in a range of from about 0.05 mil to about 0.15 mil.
3. A method according to claim 1 in which said heat fusion coating process is the fluidized bed coating process.
4. A method according to claim 1 in which said heat fusion coating process is a powder spraying coating process.
5. A method according to claim 2 in which said primer layer is formed by dipping said substrate in said primer.

References Cited by the Examiner

UNITED STATES PATENTS

| | | | |
| --- | --- | --- | --- |
| 2,709,664 | 5/1955 | Evans | 117—75 |
| 2,777,783 | 1/1957 | Welch | 117—75 |
| 2,785,993 | 3/1957 | Paist et al. | 117—75 X |
| 2,825,706 | 3/1958 | Sanders | 117—75 X |
| 2,842,459 | 7/1958 | Gollub et al. | 117—72 |
| 2,844,489 | 7/1958 | Gemmer | 117—20 |
| 2,864,722 | 12/1958 | Millar et al. | 117—72 |
| 2,887,405 | 5/1959 | Wooding | 117—75 X |
| 2,949,383 | 8/1960 | Blake | 117—72 |
| 2,951,769 | 9/1960 | McKnight | 117—72 |
| 2,958,611 | 11/1960 | Ulrich | 117—72 X |
| 3,008,848 | 11/1961 | Annonio | 117—72 |
| 3,011,909 | 12/1961 | Hart et al. | 117—72 |
| 3,035,939 | 5/1962 | Edwards | 117—75 |
| 3,039,889 | 6/1962 | Keim | 117—72 |
| 3,057,746 | 10/1962 | Edmonds | 117—29 |
| 3,070,564 | 12/1962 | Roeser et al. | 260—836 X |
| 3,105,826 | 10/1963 | Jaggard | 260—836 X |
| 3,136,651 | 6/1964 | Spessard | 117—21 |

FOREIGN PATENTS 1,056,512   4/1959   Germany.

WILLIAM D. MARTIN, *Primary Examiner.*

G. L. HUBBARD, *Assistant Examiner.*